United States Patent [19]
Park et al.

[11] Patent Number: 5,838,502
[45] Date of Patent: Nov. 17, 1998

[54] OBJECTIVE LENS FOR OPTICAL PICKUP APPARATUS

[75] Inventors: Song Chan Park, Seoul; Jin Yong Kim, Kyungki-Do, both of Rep. of Korea

[73] Assignee: LG Electronics Inc., Seoul, Rep. of Korea

[21] Appl. No.: 749,548

[22] Filed: Nov. 15, 1996

[30] Foreign Application Priority Data

Nov. 15, 1995 [KR] Rep. of Korea .................. 1995 42156

[51] Int. Cl.⁶ ................................ G02B 9/00; G11B 7/00
[52] U.S. Cl. ............................................ 359/738; 369/112
[58] Field of Search ....................... 359/737–740, 359/580, 581, 440, 232, 642, 900, 362, 569, 566, 572, 574, 16, 19; 369/116, 120, 121, 60, 100, 122, 112, 44.23, 44.12

[56] References Cited

U.S. PATENT DOCUMENTS

| | | | |
|---|---|---|---|
| 2,655,077 | 10/1953 | Bennett | 359/737 |
| 3,764,198 | 10/1973 | Hunzinger | 359/739 |
| 5,161,040 | 11/1992 | Yokoyama et al. | 359/19 |
| 5,615,199 | 3/1997 | Tatsuno et al. | 369/112 |
| 5,629,799 | 5/1997 | Maruyama et al. | 359/565 |
| 5,644,413 | 7/1997 | Komma et al. | 359/19 |
| 5,646,928 | 7/1997 | Wu et al. | 369/112 |

OTHER PUBLICATIONS

"Increase of MTF (Modulation Transfer Function) of aberration system based on an aperture modulation" New Physics (Korean Physical Society) vol. 27, No. 1, Feb. 1987.

"Effects of phase modulations to MTF of optical system," New Physics (Korean Physical Society) vol. 30, No. 6, Dec. 1990.

*Primary Examiner*—Frank G. Font
*Assistant Examiner*—Michael P. Stafira

[57] ABSTRACT

An optical pickup apparatus including an improved objective lens having at least one ring-shaped mask for preventing aberrations caused by differences in the thickness of discs being reproduced. The objective lens is capable of achieving improved focus by removing aberrations which occur when reading data from discs having different recording densities and thicknesses. The masks formed in the objective lens has a predetermined mask radius $(r_n+1)$ and a predetermined mask width $(\Delta r_n+1)$.

12 Claims, 9 Drawing Sheets

OBJECTIVE LENS FOR OPTICAL PICKUP APPARATUS

BACKGROUND OF THE INVENTION

1. Field of the Invention

The present invention relates to an objective lens for an optical pickup apparatus, and in particular to an improved objective lens for an optical pickup apparatus which makes it possible to improve a focusing capability of the objective lens by removing an aberration which occurs when reading data from discs having a different recording density and thickness and by forming a ring-shaped mask in the objective lens based on a predetermined equation. Using this invention, it is possible to record and read data on/from discs irrespective of different recording density and thickness.

2. Description of the Conventional Art

FIG. 1 is a view illustrating a conventional optical pickup apparatus.

As shown in FIG. 1, a laser diode 1 is arranged adjacent to a diffraction grating 2. Diffraction grating 2 separates a laser beam generated by laser diode 1 into a main beam and two side beams for a tracking servo.

A collimating lens 3 is arranged on an optical path of the laser beam from the laser diode 1. Collimating lens 3 generates a parallel beam.

An objective lens 4 is arranged adjacent to the collimating lens 3 for focusing the parallel beam from the collimating lens 3 on an optical disc "D".

A beam splitter 5 is arranged between the diffraction grating 2 and the collimating lens 3. A reflected beam and an incident beam from the diffraction grating 2 are incident upon beam splitter 5. Those beams are either passed at a predetermined ratio or reflected at a predetermined ratio by beam splitter 5 in accordance with the data recorded on the optical disc "D".

A sensing lens 6 is arranged below the beam splitter 5 for condensing the reflected beam from the beam splitter 5, and an optical detector 7 is arranged below the sensing lens 6 for detecting the condensed beam from the sensing lens 6.

The operation of the conventional optical pickup apparatus will now be explained.

The beam from the laser diode 1 passes through the diffraction grating 2 and the beam splitter 5, and is converted to a parallel beam by the collimating lens 3. The parallel beam from collimating lens 3 is condensed by the objective lens 4 and is reflected or diffracted in accordance with the data recorded on the optical disc "D".

The beam reflected by the surface of the optical disc "D" passes back through the objective lens 4, the collimating lens 3, the beam splitter 5 and the sensing lens 6, respectively. After passing through sensing lens 6, the beam advances to and is converted into an electrical signal by the optical detector 7.

The diffraction grating 2 and the sensing lens 6 are generally used for a tracking and focusing servo.

When a high density disc such as a digital video disc (DVD) is used, the recording density is significantly increased (e.g., four times) relative to conventional optical discs such as a common compact disc (CD). To accommodate the increased recording density and to effectively read data recorded in the digital video disc (DVD) the objective lens must have a numerical aperture of about 0.6.

In addition, as the optical disc is made thicker, the aberration which occurs due to the tilt of the optical disc is increased. Therefore, to prevent aberrations, the DVD has a thickness of about 0.6 mm which is smaller than that of conventional CDs.

Furthermore, the conventional optical pickup apparatus shown in FIG. 1 has the following problems when alternately reading data recorded on discs having different thicknesses, such as a high density optical disc (e.g., a DVD) having a thickness of about 0.6 mm and an optical disc such as a CD having a thickness of 1.2 mm.

When the beam is accurately focused on the surface of the optical disc "D" using the objective lens 4 having a thickness of 0.6 mm and a numerical aperture (NA) of 0.6 to enable a desired optical pickup operation, the beam intensity distribution is indicated by the solid line shown in FIG. 2.

However, when the beam is condensed on the optical disc "D" having a thickness of 1.2 mm by using the objective lens 4, the beam intensity distribution is indicated by the broken line shown in FIG. 2 due to the spherical aberration of the objective lens 4.

As illustrated by the variations in the beam intensity distribution between the solid and broken lines of FIG. 2, conventional systems experience significant decreases in intensity ratio of the main lobe when using the objective lens 4 to focus the beam on optical discs "D" having a thickness of 1.2 mm rather than optical disks having a thickness of 0.6 mm (e.g., DVD). In addition, since the beam intensity of the side lobe is relatively increased, the crosstalk from the signal recorded in a neighboring track is increased.

Here, the side lobe corresponds to about 5% of the main lobe. For example, the crosstalk is degraded by about −20 db when reading data recorded in the optical disc having a thickness of 1.2 mm and a track pitch of 1.6 μm using the objective lens 4 having a numerical aperture of 0.6.

The construction of the high density optical disc such as CD, DVD, etc will now be explained in more detail.

The conventional CD C1 is shown in FIG. 3A. The conventional CD includes a substrate having a thickness of 1.2 mm on which substrate pit information is recorded at a track pitch of 1.6 μm.

A high density optical disc C2 is shown in FIG. 3B. The high density optical disc includes two disks which are bonded together to increase capacity and flatness. Each bonded disc includes a substrate having a thickness of 0.6 mm on which pit information is recorded at a track pitch of 0.725 μm (or 0.8–0.9 μm).

Since the spherical aberration with respect to the optical disc is too great, it is impossible to read data recorded on the CD having a thickness of 1.2 mm by using the objective lens 4 having a numerical aperture of 0.6.

Articles entitled "Increase of MTF (Modulation Transfer Function) of aberration system based on an aperture modulation" and "Effects of phase modulations to MTF of optical system" were published in New Physics (Korean Physical society) Volume 27, Number 1, in February, 1987 and Volume 30 of the same, Number 6, February, 1990, respectively.

The former article teaches improving the effect of the MTF by performing an aperture modulation in the optical system having a predetermined aberration. The latter article teaches improving the effect of the MTF when the phase of the aperture was delayed by $\pi$.

The optical transfer function (OTF) (the theoretical background of the above-described articles) will now be explained as follows:

The OTF with respect to two-dimensional spatial frequency is obtained by the following equation.

$$D(s, t) = \frac{1}{A} \int \int_s f\left(u + \frac{s}{2}, v + \frac{t}{2}\right) *f\left(u - \frac{s}{2}, v - \frac{t}{2}\right) dudv \quad (1)$$

where the integrated area denotes the area in the circular aperture, and "A" is given by the following equation.

$$A = \iint f(u,v)*f(u,v)dudv \quad (2)$$

where the integrated area denotes the entire area of the pupil.

In addition, the pupil function f(u,v) can be expressed as follows for the substitute coordinates (u,v) on the advancing pupil:

$$f(u, v) = \tau(u, v) * \exp[ikW(u, v)]; \quad r \leq 1 \quad (3)$$
$$= 0 \quad ; \quad r > 1$$

wherein $r = [u^2 + v^2]^{1/2}$, $\tau(u,v)$ denotes the amplitude transmittance of optical wave, and $W(u,v)$ denotes the aberration function of the wave.

The value of the OTF in the optical system is not affected by the values of $\tau(u,v)$ and $W(u,v)$. The amplitude transmittance $\tau(u,v)$ in the optical system where the clear aperture is formed is generally expressed as follows:

$$\tau(u, v) = 1; r \leq 1 \quad (4)$$
$$= 0; r > 1$$

In FIG. 4, reference character "L" denotes an objective lens, and "M" denotes the shape of the numerical surface of the objective lens "L" when the phase is modulated as shown in FIG. 4, the amplitude transmittance $\tau(u,v)$ can be expressed as follows:

$$\tau(u,v)=1; r \leq r_1, r \leq 1$$

$$\tau(u,b)=0; r>1$$

$$\tau(u,v)=\exp[i\pi]; r_1 \leq r \leq r_2 \quad (5)$$

However, as shown in FIG. 4, the conventional objective lens includes a masked portion for modulating the phase of a beam signal, and a thin film is coated on a region of the objective lens "L" for shifting the beam from the laser diode, for thus increasing the focusing capability of the objective lens.

In accordance with the former article, when the beam is blocked by the numerical modulation in the non-aberration system such as that shown in FIG. 5, the spatial frequency characteristic is slightly degraded.

In addition, in an aberration system such as that shown in FIG. 6, if the spherical aberration "W" is 6λ and the coma aberration is 3λ, an aberration compensation effect is obtained rather than obtaining a spatial frequency reducing effect, for thus increasing the performance of the optical system.

FIG. 7 is a graph illustrating the relationship between the amount of spherical aberration and the lens radius when an optical disc having a thickness of 0.6 mm is employed in the conventional art. FIG. 8 is a graph illustrating the relationship between the amount of spherical aberration and the lens radius when an optical disc having a thickness of 1.2 mm is employed in the conventional art, and FIG. 9 is a graph illustrating the relationship between the amount of light and a beam radius with respect to a main beam and a side beam based on a variation in a thickness in the conventional art.

As shown therein, the conventional optical pickup apparatus is directed to simply forming a mask on the objective lens so as to increase the focusing capability of the objective lens without relying on an experimental result achieved using a predetermined equation. It is therefore impossible to obtain a desired focusing capability of the objective lens.

In particular, in the conventional optical pickup apparatus, it is impossible to experimentally and theoretically form multiple masks on the objective lens so as to prevent spherical aberration and coma aberration with both a high density disc having a thickness of 0.6 mm such as a DVD and a common optical disc such as a CD having a thickness of 1.2 mm. It is therefore impossible to achieve a desired focusing capability of the objective lens.

SUMMARY OF THE INVENTION

Accordingly, it is an object of the present invention to provide an objective lens for an optical pickup apparatus which overcomes the problems encountered in the conventional art.

It is another object of the present invention to provide an improved objective lens for an optical pickup apparatus which is capable of improving a focusing capability of an objective lens by removing an aberration which occurs when reading data from discs having different recording density and thickness and by forming a ring-shaped mask in an objective lens based on a predetermined equation. As such, the present invention is able to record and read data on/from discs irrespective of different recording densities and thicknesses.

To achieve the above objects, there is provided an objective lens for an optical pickup apparatus which includes at least one mask formed in a portion of the objective lens for preventing an occurrence of aberration due to a different thickness between discs. The mask includes a predetermined mask radius ($r_{n+1}$) and a predetermined mask width ($\Delta r_{n+1}$) which are obtained based on the following equations:

$$r_{n+1} = \sqrt[4]{\frac{4(2n+1)N^3\lambda}{(N^2-1)\Delta d}} * \left(\frac{\alpha}{NA}\right),$$

and $$\Delta r_{n+1} = \sqrt[4]{\frac{8N^3\lambda}{(N^2-1)\Delta d}} * \left(\sqrt[4]{\frac{4n+3}{4}} - \sqrt[4]{\frac{4n+1}{4}}\right) * \left(\frac{\alpha}{NA}\right)$$

where "n" denotes 0, 1, 2, 3, . . . (0 and a positive integer), "a" denotes the radius of the objective lens, "N" denotes a diffractive ratio of an optical disc, λ denotes a wavelength of a laser beam, Δd denotes the in thickness between optical discs, and NA denotes a numerical aperture of the objective lens.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The objective lens for an optical pickup apparatus according to the present invention will now be explained with reference to the accompanying drawings.

First, when reading data recorded on a compact disc (CD) having a thickness of 1.2 mm by using an objective lens which is originally designed for an optical disc having a thickness of 0.6 mm, a predetermined aberration occurs due to the different thicknesses therebetween.

This aberration is mainly caused by spherical aberration. The amount of such spherical aberration is computed in accordance with the following equation.

$$\text{Spherical aberration } (W_r) = \frac{\Delta d}{8} * \frac{(n^2 - 1)}{n^3} * NA * \left(\frac{r}{a}\right)^4 \quad (6)$$

where $\Delta d$ denotes the variation of thickness of the optical disc, "n" denotes a refractive ratio of the optical disc, NA denotes a numerical aperture of the objective lens, "a" denotes the radius of the objective lens, and "r" denotes the center of the mask.

In addition, a pupil function describing the amount of the aberration based on the diffraction of light in the equation 3 is obtained as follows based on the equation 6 and the pupil function.

$$f(r) = A \exp[ikW_r], \quad (7)$$

and $$W_r = \frac{\Delta d}{8} * \frac{(n^2 - 1)}{n^3} * NA^4 * \left(\frac{r}{a}\right)^4$$

where $\Delta d$ denotes the variation of thickness of the optical disc, "n" denotes the refractive ratio of the optical disc, NA denotes the numerical aperture of the objective lens, "a" denotes the radius of the objective lens, and "r" denotes the center of the mask.

Figure 1:
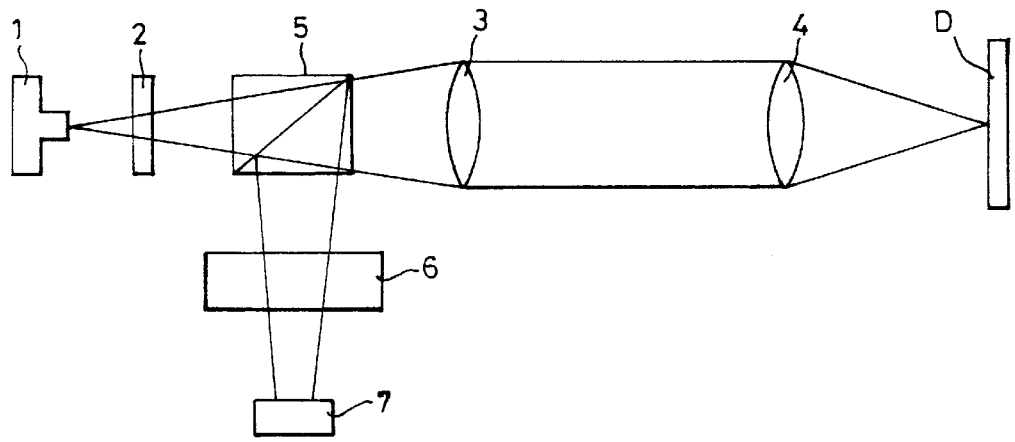
FIG. 1 is a schematic diagram illustrating a conventional optical pickup apparatus.
Figure 2:
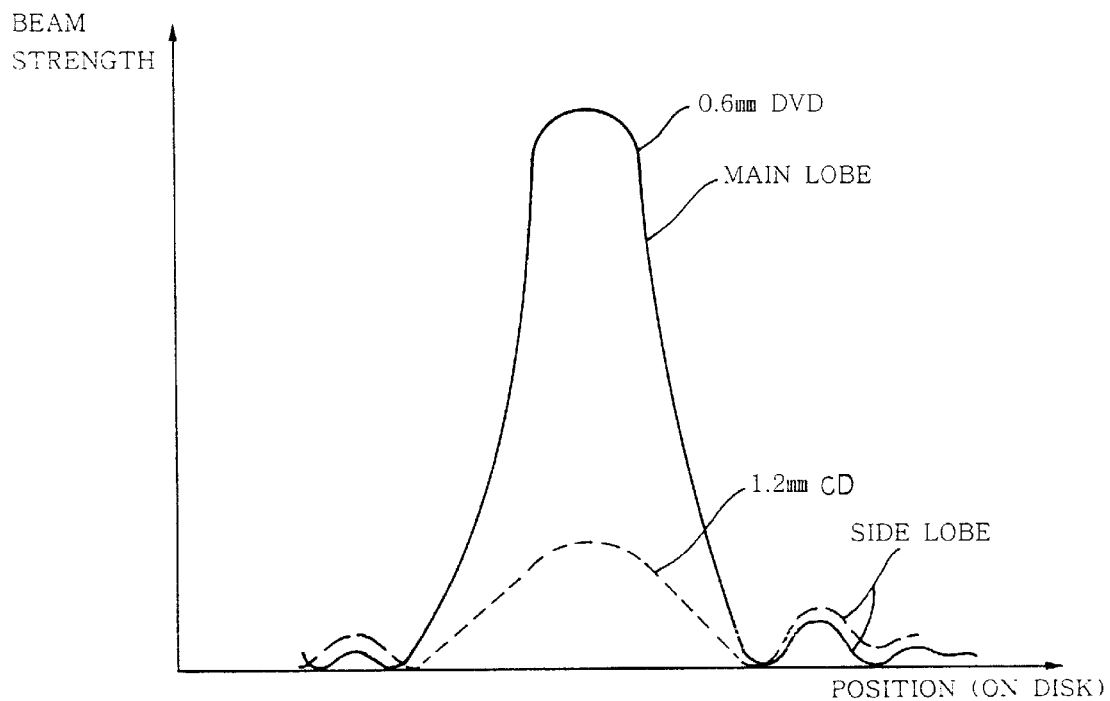
FIG. 2 is a graph illustrating a beam intensity distribution of optical discs having a different thickness for a conventional optical pickup apparatus.
Figure 3A:
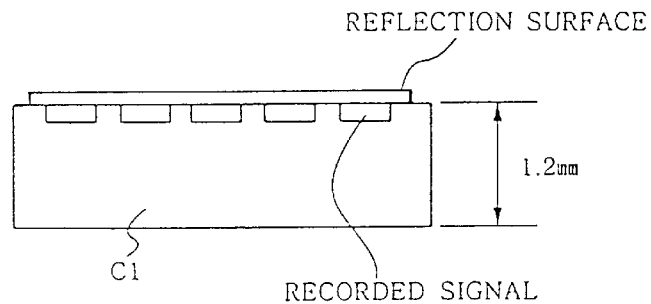
FIG. 3A is a cross-sectional view illustrating a conventional compact disc (CD)
Figure 3B:
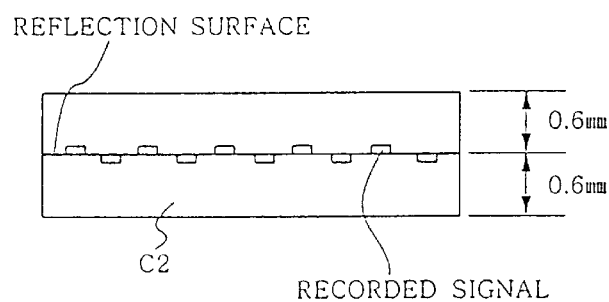
FIG. 3B is a cross-sectional view illustrating a conventional digital video disc (DVD)
Figure 4:
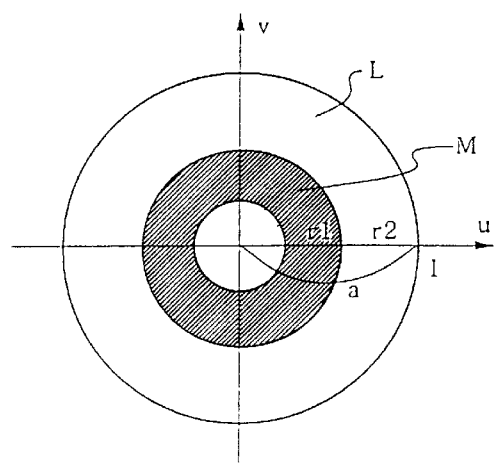
FIG. 4 is a front view illustrating a conventional objective lens having an improved focusing capability.
Figure 5:
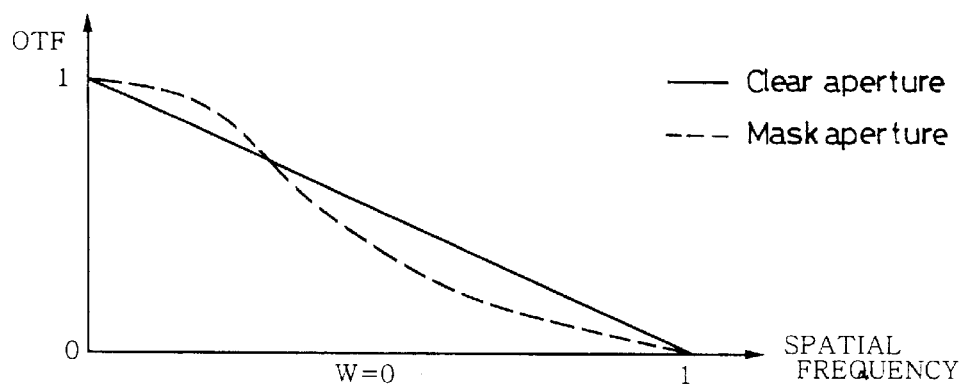
FIG. 5 is a graph illustrating the relationship between optical transfer function (OTF) and spatial frequency when there is not an aberration so as to explain a characteristic based on whether or not an aberration of the objective lens shown in FIG. 4 is given.
Figure 6:
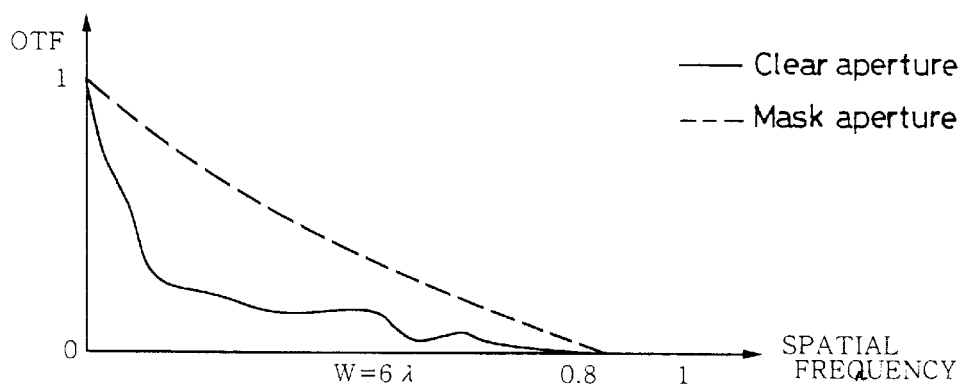
FIG. 6 is a graph illustrating the relationship between OTF and spatial frequency when there is an aberration so as to explain a characteristic based on whether or not an aberration of the objective lens shown in FIG. 4 is given.
Figure 7:
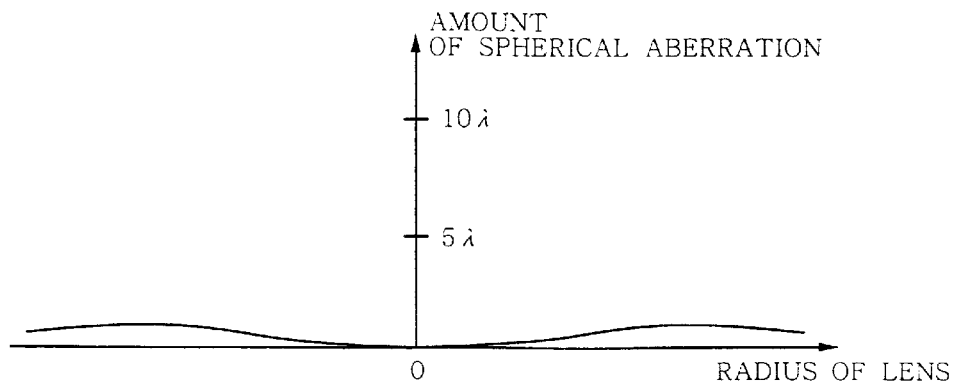
FIG. 7 is a graph illustrating the relationship between the amount of spherical aberration and the lens radius when an optical disc having a thickness of 0.6 mm is employed in the conventional art.
Figure 8:
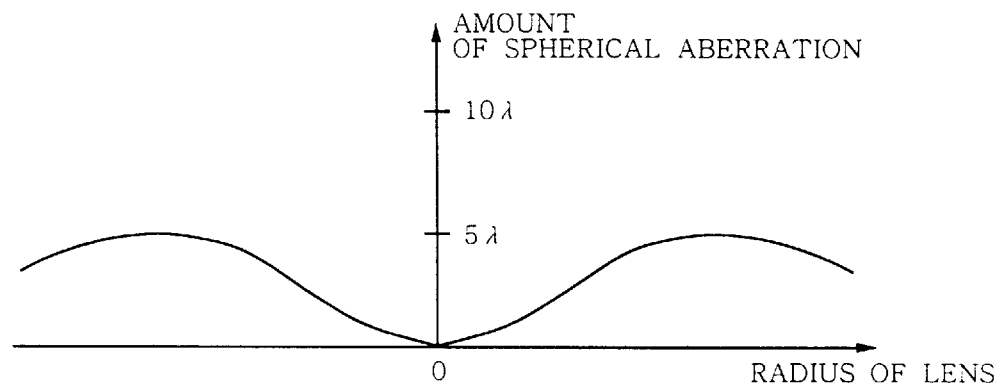
FIG. 8 is a graph illustrating the relationship between the amount of spherical aberration and the lens radius when an optical disc having a thickness of 1.2 mm is employed in the conventional art.
Figure 9:
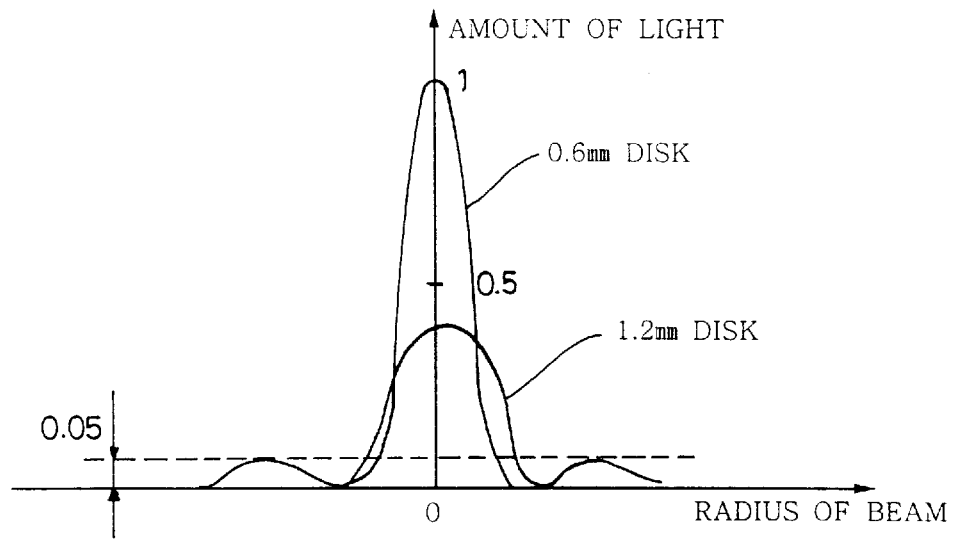
FIG. 9 is a graph illustrating the relationship between the amount of light and a beam radius with respect to a main beam and a side beam based on the change in the thickness in the disc of the conventional art.
Figure 10:
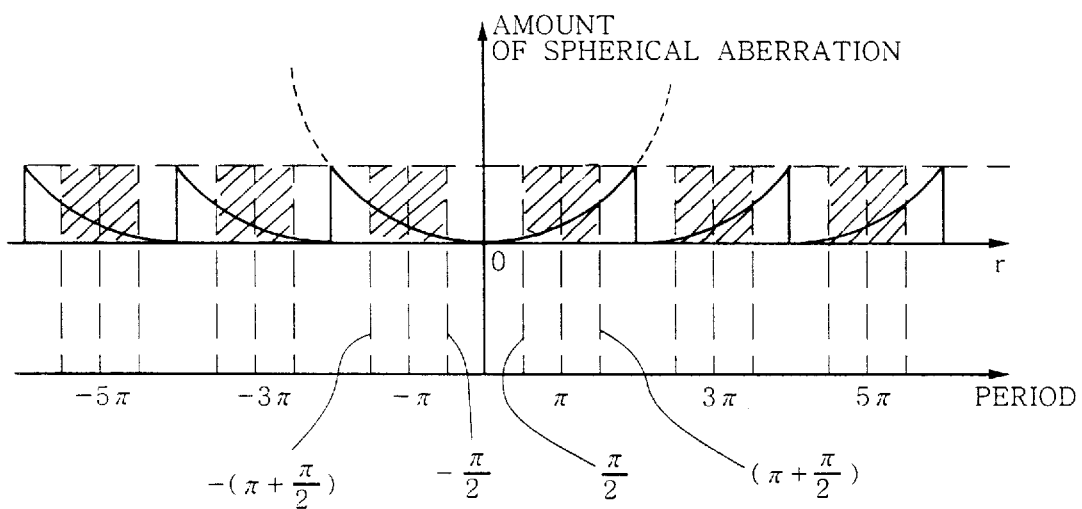
FIG. 10 is a view illustrating the formation of a mask in an objective lens for an optical pickup lens according to the present invention.

In accordance with the equation (7), the pupil function f(r) can be expressed as shown in FIG. 10, and the spherical aberration has a predetermined period in accordance with the variation of the radius of the objective lens.

Namely, since the spherical aberration is increased in the period between $\pi/2$ and $3\pi/2$, it is necessary to mask a region between $\pi/2$ and $3\pi/2$ so as to decrease the spherical aberration in cooperation with an offsetting effect between positive and negative values. Here, since the center of the mask is positioned at the period of $(2n+1)\pi$ (n: an integer number), the width of the mask becomes $\pm(\pi/2)$.

Therefore, the radius ($r_{n+1}$) of the mask of the objective lens and the width ($\Delta r_{n+1}$) of the mask thereof can be expressed as follows based on the equation (7).

$$r_{n+1} = \sqrt[4]{\frac{4(2n+1)N^3\lambda}{(N^2-1)\Delta d}} * \left(\frac{a}{NA}\right) \quad (8)$$

$$\Delta r_{n+1} = \quad (9)$$

$$\sqrt[4]{\frac{8N^3\lambda}{(N^2-1)\Delta d}} * \left(\sqrt[4]{\frac{4n+3}{4}} * \sqrt[4]{\frac{4n+1}{4}}\right) * \left(\frac{a}{NA}\right)$$

where "n" denotes 0, 1, 2, 3, . . . (0 and a positive integer), "a" denotes the radius of the objective lens, "N" denotes a diffractive ratio of an optical disc, $\lambda$ denotes a wavelength of a laser beam, $\Delta d$ denotes the thickness difference between optical discs, and NA denotes a numerical aperture of the objective lens.

Figure 13:
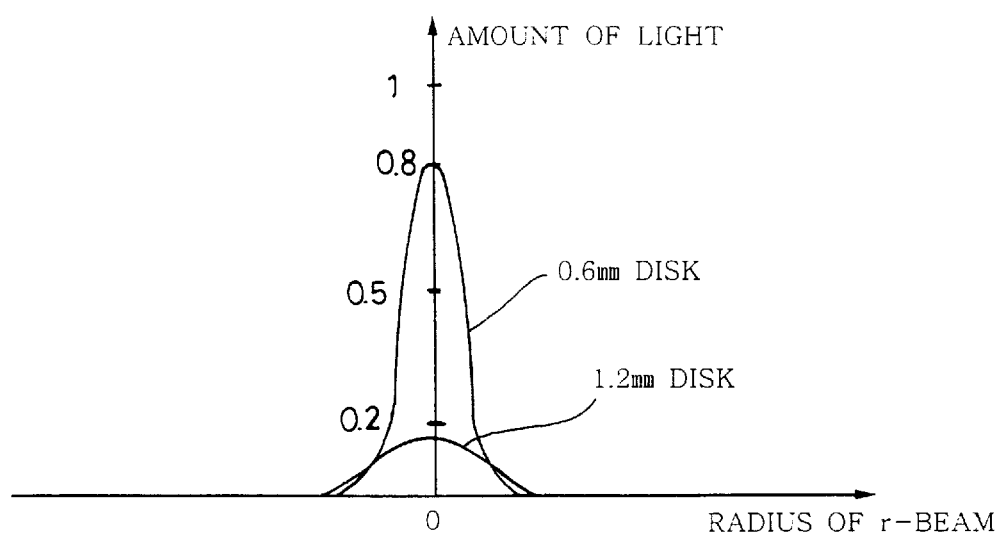
FIG. 13 is a graph illustrating the relationship between the amount of light and a beam radius with respect to a main beam and a side beam based on a mask formed in an objective lens according to the present invention.

The region between $\pi/2$ and $3\pi/2$ is masked. Thereafter, the intensity relationship between the main beam and the side beam is checked. As a result, the side beam intensity is significantly decreased like the beam intensity distribution as shown in FIG. 13.

The objective lens for an optical pickup apparatus according to a first embodiment of the present invention will now be explained.

An objective lens according to the first embodiment of the present invention was formed assuming that the thickness difference (Δd) between the discs was 0.6 mm, the diffractive ratio "N" of the objective lens was 1.55, and the numerical aperture "NA" was 0.6.

Figure 11:
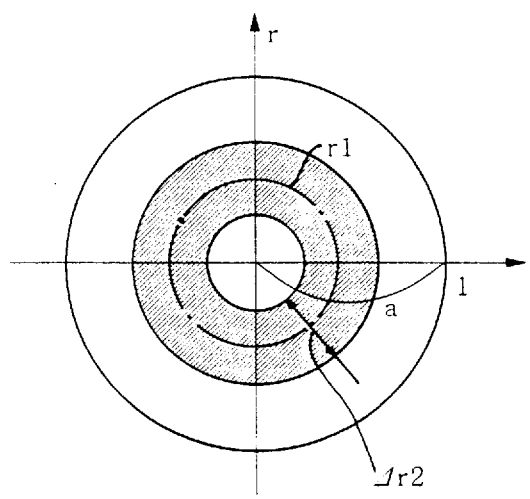
FIG. 11 is a view illustrating an objective lens for an optical pickup apparatus when one mask is formed in the objective lens according to a first embodiment of the present invention.

As shown in FIG. 11, a region between $\pi/2$ and $3\pi/2$ of the objective lens is masked by using a ring to block the beam passing thereto. Namely, as shown in FIG. 10, when the position of a first mask having a radius of $r_2$ is $(3\pi+\pi/2)$ based on $3\lambda/2$, $r_2/a=0.714\pm0.05$ mm, and when the width of the mask is $3/2\lambda\pm1/4\lambda$, $\Delta r_2/a=0.062\pm0.005$ mm wherein n=1.

Next, the objective lens for an optical pickup apparatus according to a second embodiment of the present invention will now be explained.

Figure 12:
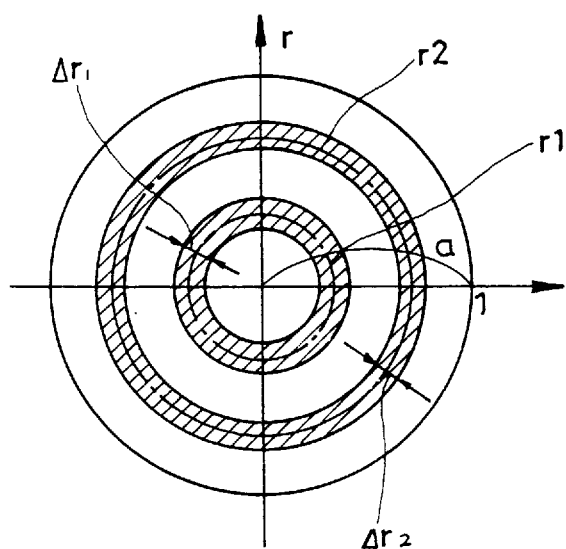
FIG. 12 is a view illustrating an objective lens for an optical pickup apparatus when two masks are formed in the objective lens according to a second embodiment of the present invention.

As shown in FIG. 12, when forming two masks on the objective lens by using two rings, when the position $(r_1)$ of a first mask is $\pi\pm\pi/2$ based on $\lambda/2$ as shown in FIG. 10, $r_1/a=0.545\pm0.05$ mm, and when the width of the first mask is $1/2\lambda\pm1/8\lambda$, and $\Delta r_1/a=0.062\pm0.005$ mm, and when the position $(r_2)$ of a second mask is $3\pi\pm\pi/2$ based on $3\lambda/2$, $r_2/a=0.714\pm0.05$ mm, and the width of the second mask is $3/2\lambda\pm1/4\lambda$, and $\Delta r_2/a=0.062\pm0.005$ mm wherein n=1.

As shown in FIGS. 11 and 12, when forming one or two masks on an optimum position of the objective lens based on the diffraction of the beam, the ratios of the main beam and the side beam intensities are decreased to 1.58% and 2.4%, respectively, as shown in FIG. 13.

Unlike the first embodiment of the present invention, a thin film for obtaining an optical phase difference of 180° may be preferably formed rather than forming the above-described masks on the objective lens.

Figure 14:
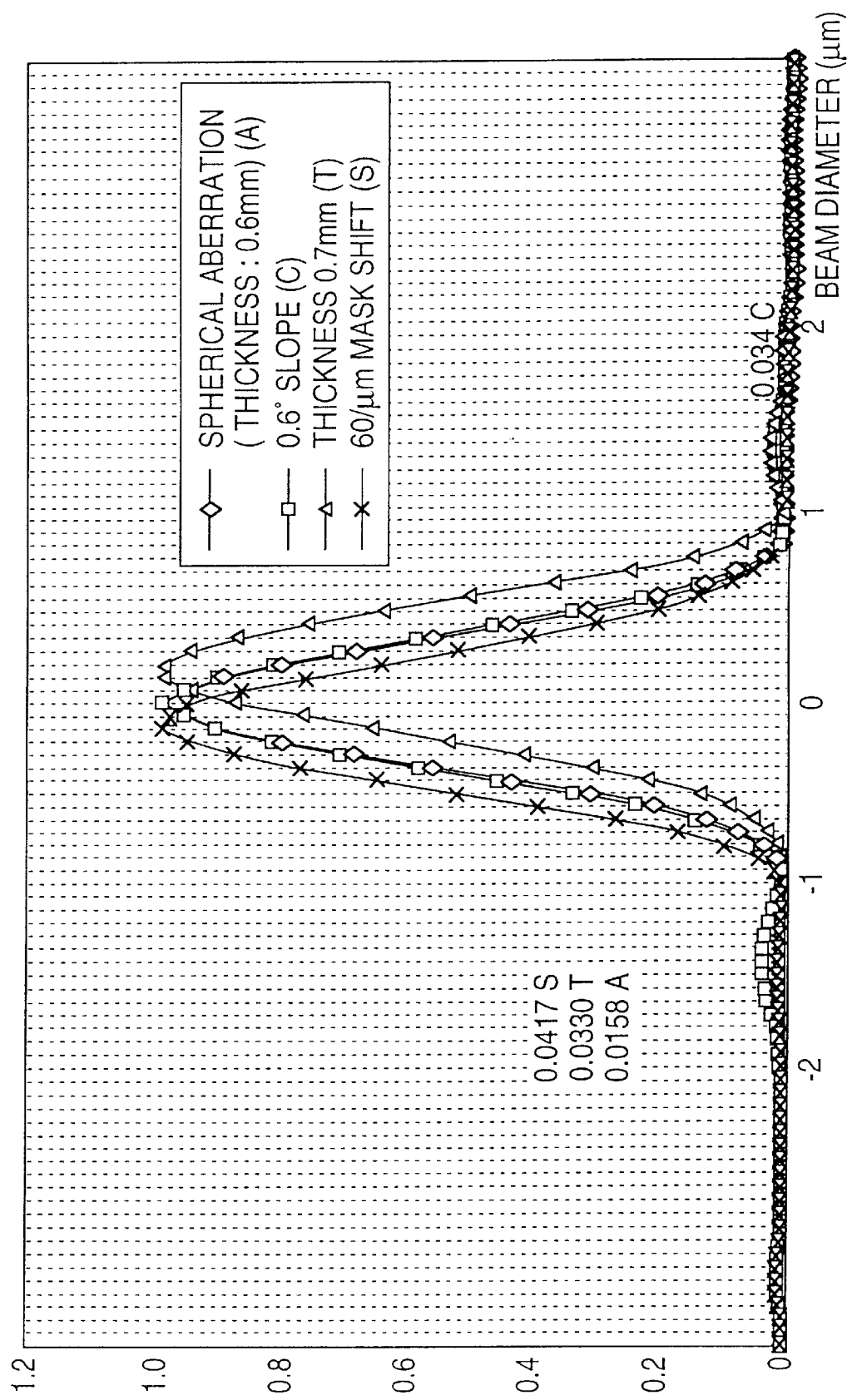
FIG. 14 is a graph illustrating a relationship between the amount of light and a beam radius with respect to a main beam and a side beam when one mask is formed in an objective lens according to the first embodiment of the present invention.

FIG. 14 is a graph illustrating the relationship between the amount of light and the beam radius with respect to a main beam and a side beam when one mask is formed in an objective lens with respect to the CD which is thicker than the DVD by 0.6 mm.

In FIG. 14, plot "A" is related to a CD having a thickness of 1.2 mm, which CD is thicker than the DVD by plot "C" is related to a CD which is slanted at an angle of 0.6°; and plot "T" is related to a CD having a thickness of 1.3 mm, which CD is thicker than the DVD by 0.7 mm, namely, the thickness difference of 0.1 mm is given due to the fabrication allowance. In addition, plot "S" is related to an objective lens in which the position of the mask is shifted by 60 μm.

In more detail, as shown in FIG. 14, when the CD "A" having a thickness of 1.2 mm was used, the formation ratio of the side lobe beam was 1.58% with respect to the main lobe beam. When the CD "C" was slanted at an angle of 0.6°, the formation ratio of the side lobe beam was 3.45% with respect to the main beam. When the CD "T" having a thickness of 1.3 mm was used, the formation ratio of the side lobe beam was 3.35%. When the CD "S" was used with which the mask was shifted, the formation ratio of the side lobe beam was 4.17% with respect to the main beam.

As described above, when the position of the mask was shifted, the side beam was most significantly affected. In addition, the CD having a thickness of 1.2 mm was used, the side lobe beam formation was significantly reduced.

Figure 15:
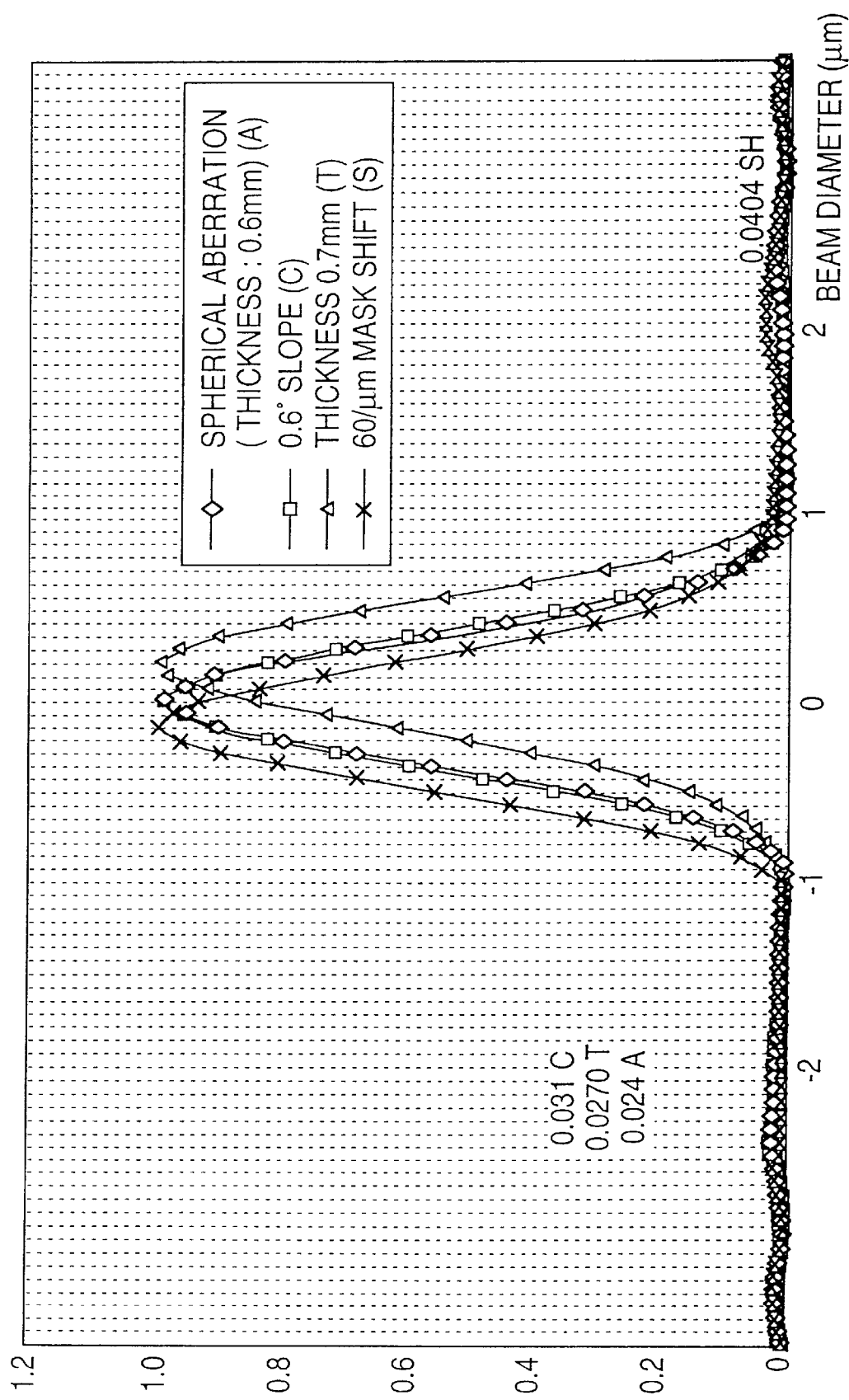
FIG. 15 is a graph illustrating the relationship between the amount of light and a beam radius with respect to a main beam and a side beam when two masks are formed in an objective lens according to the second embodiment of the present invention.

FIG. 15 is a graph illustrating the relationship between the amount of light and the beam radius with respect to a main beam and a side beam when two masks are formed in an objective lens according to the second embodiment of the present invention.

As shown therein, when the CD "A" having a thickness of 1.2 mm was used, the side lobe beam formation ratio was 2.4% with respect to the main lobe beam formation. When the CD "C" which was slanted at an angle of 0.6° was used, the side lobe beam formation ratio was 3.1% with respect to the main lobe beam formation. When the CD "T" having a thickness of 1.3 mm was used, the side lobe beam formation ratio was 2.7% with respect to the main lobe beam formation. When the CD "S" was used with which the mask formed in the objective lens was shifted by 60 μm, the side lobe beam formation ratio was 4.04% with respect to the main lobe formation. Therefore, it is possible to obtain results which are similar to results shown in FIG. 14.

Two methods for fabricating the objective lens for an optical pickup apparatus according to the present invention will now be explained.

Figure 16:
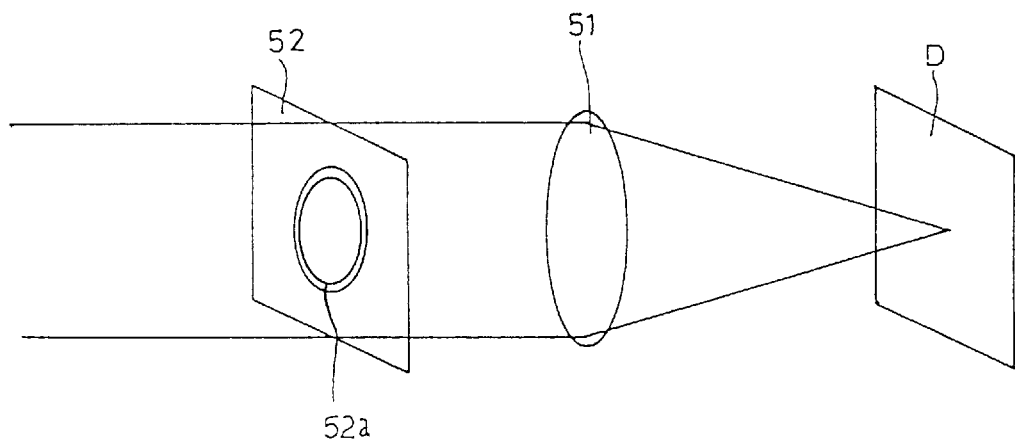
FIG. 16 is a perspective schematic view illustrating the construction of an apparatus for fabricating an objective lens for an optical pickup apparatus by using a transparent blocking film according to the present invention.

As shown in FIG. 16, a transparent blocking plate 52 is arranged adjacent to the lens 51. Transparent blocking plate 52 has a phase modulation film 52a formed therein in a ring shape as the mask for blocking the beam and for converting the phase of the beam by an angle of 180°.

Figure 17:
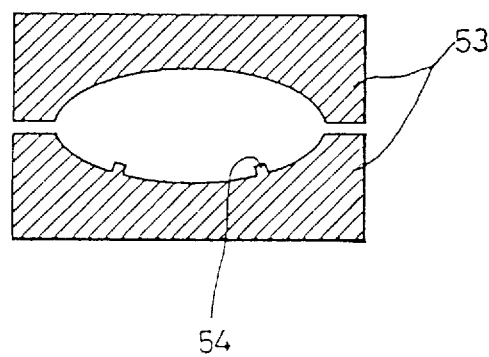
FIG. 17 is a cross-sectional view illustrating a molding device for fabricating an objective lens according to the present invention.

Another method for fabricating the objective lens is shown in FIG. 17. The method of FIG. 17 forms a protruded portion 54 (or a recessed portion) in the region where the mask is to be formed so as to block the beam from passing through the region. A thin film may be formed in the region so as to obtain a phase difference at an angle of 180°.

Since the optical pickup apparatus according to the present invention has a common construction to the conventional art except for the above-described objective lens, description of the other elements thereof is omitted.

As described above, the objective lens for an optical pickup apparatus according to the present invention is directed to computing the amount of spherical aberrations which change in accordance with the variation of thickness of an optical disc, for thus determining the position of the mask formed in the objective lens.

Therefore, a relationship between the main beam and the side beam is set based on the variation of the position of the mask and the width of the mask, preventing the reduction of the beam signal intensity between neighboring pits in which interference occurs due to the side beam.

In addition, it is possible to reduce the size difference between the main beam in which the interference is small between neighboring tracks and the side beam in which the interference is big between neighboring tracks to below 3%, whereby it is possible to read both data recorded in a DVD and a CD thicker than the DVD by using the same objective lens.

In more detail, in the optical pickup apparatus having the objective lens according to the present invention, only the amount of light is decreased in the optical disc having a thickness of 0.6 mm of the DVD, and the relationship between the main beam and the side beam is below 1%, so it is possible to effectively read data recorded in the DVD. In addition, since it is possible to reduce the ratio between the main beam and the side beam to below 3% in even the CD having a thickness of 1.2 mm, data recorded in different optical discs can be read.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An objective lens for an optical pickup apparatus, comprising a ring-shaped mask formed in a portion of the objective lens for preventing aberrations caused when reproducing data from optical discs having different thicknesses, said mask having a mask radius ($r_{n+1}$) and a mask width ($\Delta r_{n+1}$) which are obtained based on the following equations:

$$r_{n+1} = \sqrt[4]{\frac{4(2n+1)N^3\lambda}{(N^2-1)\Delta d}} * \left(\frac{a}{NA}\right),$$

and $$\Delta r_{n+1} = \sqrt[4]{\frac{8N^3\lambda}{(N^2-1)\Delta d}} * \left(\sqrt[4]{\frac{4n+3}{4}} - \sqrt[4]{\frac{4n+1}{4}}\right) * \left(\frac{a}{NA}\right)$$

where "n" denotes 0, 1, 2, 3, . . . (0 and a positive integer), "a" denotes the radius of the objective lens, "N" denotes a diffractive ratio of an optical disc, $\lambda$ denotes a wavelength of a laser beam, $\Delta d$ denotes the thickness difference between optical discs, and NA denotes a numerical aperture of the objective lens.

2. The apparatus of claim 1, wherein said mask has a radius ($r_2$), when the position of the mask is $3\pi \pm \pi/2$ based on $3/2\lambda$, $r_2/a=0.714\pm0.05$ mm, and when the width of the mask is $3/2\lambda\pm1/4\lambda$, $\Delta r_2/a=0.062\pm0.005$ mm, where N=1.55, $\lambda$=635±20 nm, $\Delta d$=0.6±0.1 mm, and NA=0.6.

3. The apparatus of claim 1, wherein a number of said masks is two, when the position of a first mask is $\pi\pm\pi/2$ based on $\lambda/2$, $r_1/a=0.545\pm0.05$ mm, the width of the first mask is $1/2\lambda\pm1/8\lambda$, $\Delta r_1/a=0.062\pm0.005$ mm, the position of a second mask is $3\pi\pm\pi/2$ based on $3/2\lambda$, $r_2/a=0.714\pm0.05$ mm, and the width of the second mask is $3/2\lambda\pm1/4\lambda$, $\Delta r_2/a=0.062\pm0.005$ mm, where N=1.55, $\lambda$=635±20 nm, $\Delta d$=0.6±0.1 mm, and NA=0.6.

4. The apparatus of claim 1, wherein said mask is formed by a a phase modulation film which changes a phase of a beam signal by an angle of 180°, said phase modulation film being formed on a transparent blocking film arranged in front of the objective lens.

5. The apparatus of claim 1, wherein said mask is formed with a phase difference at an angle of 180° by one of a thin film, a protruded portion and a recessed portion for blocking the laser beam.

6. An objective lens for an optical pickup apparatus, comprising:
    a communication device having a lens for communicating data with discs having different thicknesses; and
    at least two ring-shaped masking films formed in said lens for preventing an aberration due to a diffraction of a laser beam by the disc.

7. The apparatus of claim 6, wherein said lens is an objective lens.

8. The apparatus of claim 6, wherein said ring-shaped masking film is directed to blocking a laser beam incident thereto.

9. The apparatus of claim 6, wherein said film is directed to converting a phase of a laser beam by an angle of 180°.

10. The apparatus of claim 6, wherein said aberration periodically appears in a region ranging from $\pi/2$ to $3\pi/2$.

11. An objective lens for an optical pickup apparatus, comprising:
    an objective lens; and
    at least one ring-shaped masking film formed in said objective lens for removing a spherical aberration and a coma aberration which occur due to a diffraction of light when data is communicated with optical discs having different thicknesses.

12. The apparatus of claim 6, wherein said aberration results when reproducing data from optical discs having different thicknesses.

* * * * *